United States Patent
Lassiter, Jr.

(10) Patent No.: US 6,601,096 B1
(45) Date of Patent: Jul. 29, 2003

(54) CLIENT SERVER METHOD FOR LOADING A CLIENT WITH A SPECIFIC IMAGE OR UTILITY BASED ON THE CLIENT'S STATE

(75) Inventor: Linwood Ottis Lassiter, Jr., Four Oaks, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,743

(22) Filed: Jan. 4, 2000

(51) Int. Cl.[7] .............................................. G06F 15/177
(52) U.S. Cl. ........................ 709/222; 709/227; 713/2; 713/200
(58) Field of Search ................................ 709/227, 217, 709/219, 223; 713/2, 200

(56) References Cited

U.S. PATENT DOCUMENTS

| | | | |
|---|---|---|---|
| 5,812,819 A | * | 9/1998 | Rodwin et al. ............... 703/23 |
| 5,826,027 A | | 10/1998 | Pedersen et al. |
| 5,848,233 A | | 12/1998 | Radia et al. |
| 5,872,968 A | | 2/1999 | Knox et al. |
| 5,875,306 A | | 2/1999 | Bereiter |
| 5,884,024 A | | 3/1999 | Lim et al. |
| 6,421,777 B1 | * | 7/2002 | Pierre-Louis et al. .......... 713/2 |

OTHER PUBLICATIONS

PXE Engineering. Aug. 27, 1999. Intel Architecture Labs, PXE Product Development Kt Instructions Version 3 pp. 1–53.*
IBM. 1998. WorkSpace On–Demand 2.0 Administrator's Guide.pp. 1–4.*

* cited by examiner

Primary Examiner—Krisna Lim
Assistant Examiner—Yasin M Barqadle
(74) Attorney, Agent, or Firm—J. Bruce Schelkopf; Sawyer Law Group

(57) ABSTRACT

PXE Frame extension tags are used for remote boot loading client machines to afford servers deterministic ability for what image or utility the client requires based on its boot state. The invention takes advantage of the PXE frame by using the DHCP/PXE Vendor Tags for providing information to the PXE Server as to what image or boot process is required from the server by the client. This solution is targeted primarily, but not limited to, "media less" or "thin clients". The invention provides the client an ability to give a DHCP/PXE server more deterministic information about itself. The server can use this information (i.e. information contained within the Extension tags) to determine more precisely the client machine's boot state DHCP/PXE server code parseses the DHCP/PXE extension tags (contained within the DHCP/PXE data frame) and uses the POST error information and/or the Vital Product Data (VPD) to provide the client with a tailored boot image.

5 Claims, 3 Drawing Sheets

FIG. 2

Vendor Extension Tag 128 (Vital Product Data)
This option specifies the client VPD information transmitted within the DHCP/PXE Frame.

The code for this option is 128, and its length is 48:

| Code | Len | Data 1 | Data 2 | ... | Data 48 |
|------|-----|--------|--------|-----|---------|
| 128  | 48  | AA     | 55     | ... | checksum |

FIG. 3

Vendor Extension Tag 129 (POST Error Log)
This option specifies the client POST error log information transmitted within the DHCP/PXE Frame.

The code for this option is 129, and its length is 10:

| Code | Len | Error1 Word | ... | ... | ... | ... | Data 48 |
|------|-----|-------------|-----|-----|-----|-----|---------|
| 129  | 10  |             | ... | ... | ... | ... | checksum |

CLIENT SERVER METHOD FOR LOADING A CLIENT WITH A SPECIFIC IMAGE OR UTILITY BASED ON THE CLIENT'S STATE

BACKGROUND OF THE INVENTION

1. Field of the Invention

This invention relates to an improved method for booting client computers from a server interconnected in a client server network using the DHCP/PXE protocols, and more particularly, to a method that enables the server to load a specific image or utility for a boot requesting client based on the client's state.

2. Description of the Prior Art

As will be appreciated by those skilled in the art, in a client server network, when a so called "diskless" or "thin client" is powered up, for example, the client executes code within a non-volatile memory within the client. This code causes a server on the network to transfer an image (i.e. operating system software, utility software) to the volatile memory of the client, which image is used by the client until power is interrupted to the client or there is a need to re-boot for some other reason.

As will be appreciated by those skilled in the art, protocol standards for Internet client server networks have been developed and adopted, including protocols for booting a client from a server. Computer networks that use the Internet protocol are commonly referred to as "IP networks." Within IP networks, host systems and other objects are identified as Internet Protocol Addresses (IP addresses). IP addresses provide a simple mechanism for identifying the source and destination of messages sent within IP networks. Increasingly, IP addresses within IP networks are assigned using the dynamic Host configuration Protocol (DHCP) defined in Internet RFC 1541 which is incorporated herein by reference. In networks that use the DHCP protocol, client systems request IP addresses from a DHCP server. The DHCP server allocates an IP address for use by the requesting client system and sends the client a message telling the client system which IP address to use.

The Preboot Execution Environment (PXE) Specification, Version 2.0 dated Dec. 28, 1998 (which is incorporated herein by reference), provides a downloaded Network Bootstrap Programs with a uniform and consistent pre-boot operating environment within the booting client, so it can accomplish its task independent of, for example, the type of network adapter implemented in the system. This capability is useful in enhancing the manageability of the client machine in several situations; for example:

Remote new system setup. If the client does not have an OS installed on its hard disk, or the client has no hard disk at all, downloading a NBP from a server can help automate the OS installation and other configuration steps.

Remote emergency boot. If the client machine fails to boot due to a hardware or software failure, downloading an executable image from a server can provide the client with a specific executable that enables remote problem notification and diagnosis.

Remote network boot. In instances where the client machine has no local storage, it can download its system software image from the server in the course of normal operation.

PXE is defined on a foundation of industry-standard Internet protocols and services that are widely deployed in the industry, namely TCP/IP, DHCP, and TFTP. These standardize the form of the interactions between clients and servers. To ensure that the meaning of the client-server interaction is standardized as well, certain vendor option fields in DHCP protocol are used, which are allowed by the DHCP standard. The operations of standard DHCP and/or BOOT servers (that serve up IP addresses and/or NBPs) will not be disrupted by the use of the extended protocol. Clients and servers that are aware of these extensions will recognize and use this information, and those that do not recognize the extensions will ignore them.

In brief, the PXE protocol operates as follows. The client initiates the protocol by broadcasting a DHCPDISCOVER containing an extension that identifies the request as coming from a client that implements the PXE protocol. Assuming that a DHCP server or a Proxy DHCP server implementing this extended protocol is available, after several intermediate steps, the server sends the client a list of appropriate Boot Servers. The client then discovers a Boot Server of the type selected and receives the name of an executable file on the chosen Boot Server. The client uses TFTP to download the executable from the Boot server. Finally, the client initiates execution of the downloaded image. At this point, the client's state must meet certain requirements that provide a predictable execution environment for the image. Important aspects of this environment include the availability of certain areas of the client's main memory, and the availability of basic network I/O services.

In the prior art, the images and utilities downloaded from the server in the operation of booting a client are independent of the boot state of the client.

SUMMARY OF THE INVENTION

An object of this invention is the provision of a method that is consistant with existing established protocols and that allows a client to give a DHCP/PXE server more deterministic information about the client in order to allow the server to provide the client with an image taylored to the client.

Briefly, this invention contemplates the use of PXE Frame extension tags for remote boot loading client machines will afford servers deterministic ability for what image or utility the client requires based on its boot state. The invention takes advantage of the PXE frame by using the DHCP/PXE Vendor Tags for providing information to the PXE Server as to what image or boot process is required from the server by the client. This solution is targeted primarily, but not limited to, "media less" or "thin clients". The invention provides the client an ability to give a DHCP/PXE server more deterministic information about itself. The server can use this information (i.e. information contained within the Extension tags) to determine more precisely the client machine's boot state DHCP/PXE server code parseses the DHCP/PXE extension tags (contained within the DHCP/PXE data frame) and uses the POST error information and/or the Vital Product Data (VPD) to provide the client with a tailored boot image. For example, this tailored image can supply a fix for the client POST error condition that was reported to the Server via the tag containing the POST error information. Conversely, the server can evaluate the VPD information contained within the tag to determine, for example, that the client POST code (firmware) is in need of updating and the server sends the appropriate boot image to the client. Also, the tag information (POST error and VPD) could be used in combination to allow the server to determine even a more appropriate boot image for the requesting client.

BRIEF DESCRIPTION OF THE DRAWINGS

The foregoing and other objects, aspects and advantages will be better understood from the following detailed description of a preferred embodiment of the invention, in which:

FIG. 2 is a diagram illustrating the Vendor Extention Tag 128 used to transmit client boot state data in accordace with the teachings of this invention;

FIG. 3 is a diagram illustrating the Vendor Extension Tag 129 used to transmit client POST error log data in accordance with the teachings of this invention.

DETAILED DESCRIPTION OF A PREFERRED EMBODIMENT

Figure 1:
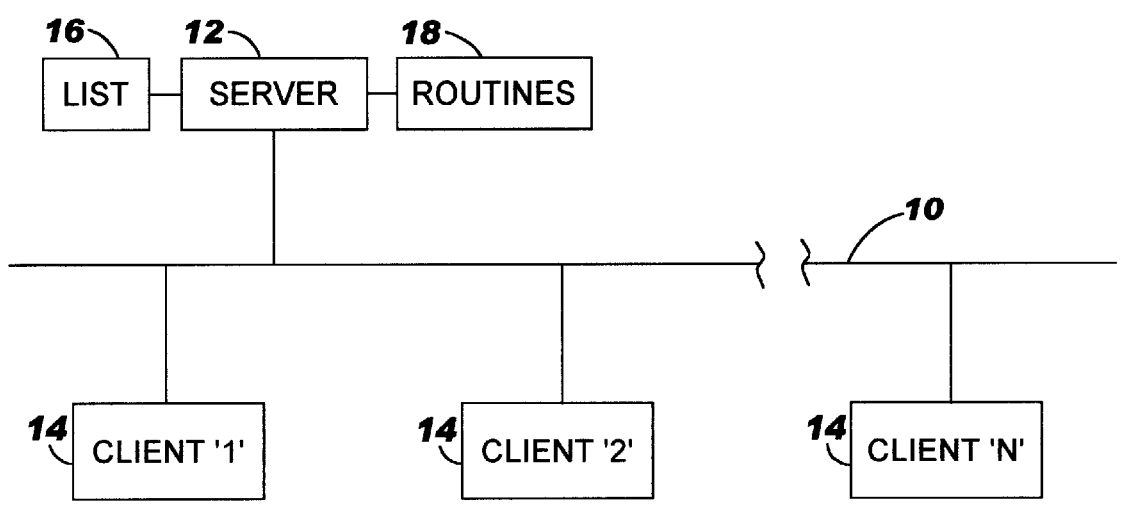
FIG. 1 is a block diagram of typical client server network to which the teachings of this invention apply.

Referring now to FIG. 1, a network 10 connects one or more servers 12 to a plurality of clients 14. The client server network uses DHCP/PXE protocols to assign network addresses to each clients 14, which transmits a DHCP/PXE request each time it boots. The server 12 includes also software and/or firmware routines 18 that can be down loaded in response to the VPD and/or POST error states of the client.

Referring now to FIGS. 2 and 3 as well as FIG. 1, in accordance with the teachings of this invention, as part of the booting process, the client 14 transmits to the server 12 the DHCP/PXE Vendor Extension Tag 128, illustrated in FIG. 2, with vital product data relating to the client in the tag data fields. The client also transmits the Vendor Extension Tag 129, illustrated in FIG. 3, with POST error log data in the tag data fields. Here it will be appreciated that the Vendor Extension Tag 129 is transmitted conditionally, based on the existence of POST errors. A typical client vital product data block has a fixed number of bytes at a fixed address.

Figure 4:
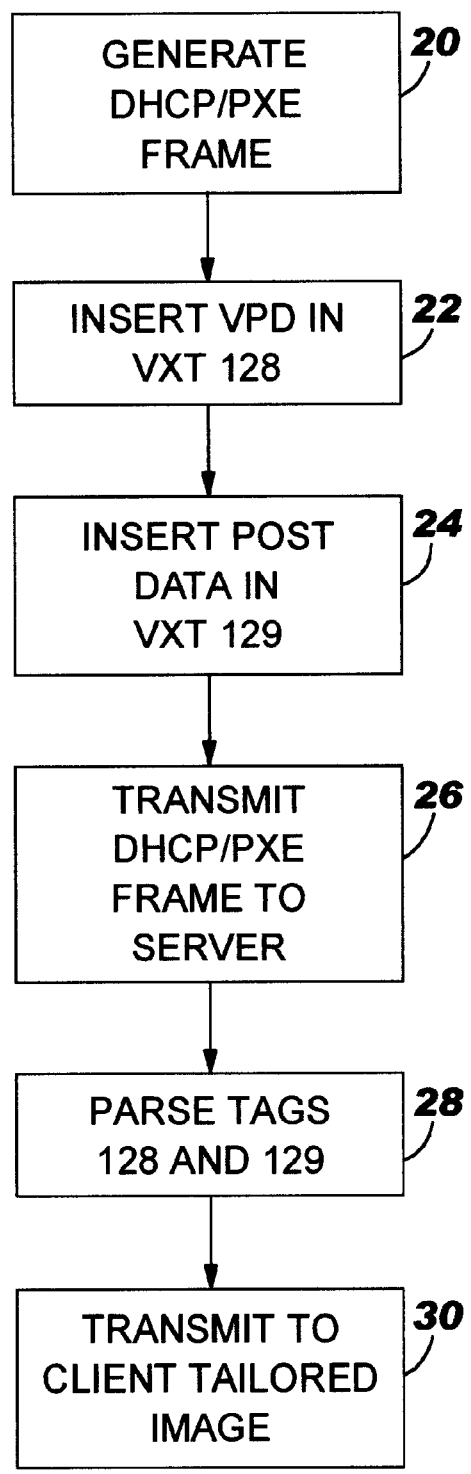
FIG. 4 is a flow chart illustrating the steps in booting a client from a DCHCP/PXE server in accordance with the teachings of this invention.

Referring now to FIG. 4, in accordance with the teaching of this invention, in a boot operation, a client generates a DHCP/PXE frame, block 20. The client inserts vital product data in the Vendor Extension Tag 128, block 22, and POST error log information, if any, in Vendor Extension Tag 129, block 24. The DHCP/PXE frame, including the extension tags 128 and 129 are transmitted from the client 14 to the server 12 at block 28. The server parses the data in tags 128 and 129 (block 28), and provides the client an image tailored image based on the data in extension tags 128 and/or 129, block 30. For example, the tailored image can be an image that supplies a fix for the client POST error condition that is reported to the server via the tag containing the POST error information. In addition, the server can evaluate vital product data contained within the tag to determine, for example, that the client POST code (i.e. firmware) is in need of updating and the server sends the appropriate boot image to the client. Also, the POST error information and the vital product data information can be used together by the server to determine a appropriate boot image for the requesting client.

While the invention has been described in terms of a single preferred embodiment, those skilled in the art will recognize that the invention can be practiced with modification within the spirit and scope of the appended claims.

What is claimed is:

1. A method for loading a client with an image from a server, including the steps of:

(a) at the client:
generating a DHCP/PXE frame;
inserting vital product data relating to the client in data fields of the vendor extension Tag 128 of the DHCP/PXE frame;
transmitting the DHCP/PXE frame with said vendor extension Tag 128 to the server;

(b) at the server;
parsing the vital product data transmitted in the vendor extension Tag 128;
transmitting an image to the client based on the vital product data transmitted in the vendor extension Tag 128.

2. A method for loading a client with an image from a server, including the steps of:

(a) at the client:
generating a DHCP/PXE frame;
inserting vital product data relating to the client in data fields of the vendor extension Tag 128 of the DHCP/PXE frame;
inserting POST error log information in data fields of the vendor extension Tag 129 of the DHCP/PXE frame;
transmitting the DHCP/PXE frame with said vendor extension Tags 128 and 129 to the server;

(b) at the server;
parsing the vital product data transmitted in the vendor extension Tag 128;
parsing the POST error log information transmitted in vendor extension Tag 129;
transmitting an image to the client based on the vital product data transmitted in the vendor extension Tags 128 and 129.

3. A method for loading a client with an image from a server, including the steps of:

(a) at the client:
generating a DHCP/PXE frame;
inserting POST error log information in data fields of the vendor extension Tag 129 of the DHCP/PXE frame;
transmitting the DHCP/PXE frame with said vendor extension Tag 129 to the server;

(b) at the server;
parsing the POST error log information transmitted in vendor extension Tag 129;
transmitting an image to the client based on the post error log information transmitted in the vendor extension Tag 129.

4. A method for loading a client with an image from a server, including the steps of:

(a) at the client:
generating a boot frame;
inserting vital product data relating to the client in data fields of a vendor extension tag of the boot frame;
transmitting the boot frame with said vendor extension tag to the server;

(b) at the server;
parsing the vital product data transmitted in the vendor extension tag;
transmitting an image to the client based on the vital product data transmitted in the vendor extension tag.

5. A method for loading a client with an image from a server, including the steps of:

(a) at the client:
generating a boot frame;
inserting POST error log information in data fields of a vendor extension tag of the boot frame;
transmitting the boot frame with said vendor extension tag to the server;

(b) at the server;
parsing the POST error log information transmitted in vendor extension tag;
transmitting an image to the client based on the post error log information transmitted in the vendor extension tag.

* * * * *